United States Patent [19]
Govindaraj et al.

[11] Patent Number: 6,101,425
[45] Date of Patent: *Aug. 8, 2000

[54] MULTIPLE CONNECTION NETWORKED MAN-MACHINE INTERFACES FOR COMPUTER NUMERICAL CONTROLS

[75] Inventors: Subbian Govindaraj, South Euclid; George J. Sevcik, Brecksville; Thomas J. Peshek, Chardon, all of Ohio

[73] Assignee: Allen-Bradley Company, LLC, Milwaukee, Wis.

[*] Notice: This patent is subject to a terminal disclaimer.

[21] Appl. No.: 08/979,985

[22] Filed: Nov. 26, 1997

[51] Int. Cl.⁷ .............................. G06F 19/00; G06G 7/66
[52] U.S. Cl. .............................. 700/181; 700/56; 700/97; 700/104; 700/145; 700/165; 700/182
[58] Field of Search .................. 318/561, 568.1; 700/181

[56] References Cited

U.S. PATENT DOCUMENTS

| | | | |
|---|---|---|---|
| 4,418,381 | 11/1983 | Molusis et al. | 364/131 |
| 5,617,528 | 4/1997 | Stechmann et al. | 395/326 |
| 5,652,866 | 7/1997 | Aldred et al. | 395/500 |
| 5,691,897 | 11/1997 | Brown et al. | 364/167.02 |
| 5,737,523 | 4/1998 | Callaghan et al. | 395/187.01 |
| 5,764,155 | 6/1998 | Kertesz et al. | 340/825.08 |
| 5,822,207 | 10/1998 | Hazama et al. | 364/468.03 |
| 5,828,575 | 10/1998 | Sakai | 364/474.24 |
| 5,852,441 | 12/1998 | Nakajima et al. | 345/352 |

OTHER PUBLICATIONS

Walter Stanislowski, "Instrument Control Enhancements Using Microsoft Windows 3.0", IEEE 1992, pp. 239–242.
Dorin Carstoiu et al., "Netware Dynamic Data Exchange", IEEE 1994, pp. 284–287.
Barcellos et al., "A Novel Waveform Analyzer For Analog and Digital Signals For The Windows® Environment".

Primary Examiner—William Grant
Assistant Examiner—McDieunel Marc
Attorney, Agent, or Firm—Fletcher, Yoder & Van Someren

[57] ABSTRACT

A system combines multiple man-machine interfaces with multiple computer numerical controls over a network. Typically, each man-machine interface comprises a personal computer with a Windows-based operating system utilizing a standard process-to-process communication protocol, such as Dynamic Data Exchange (DDE). This type of system allows a wide variety of M-to-N topologies in CNC environments. Further, the use of standard personal computer operating systems and common process-to-process communication protocols permits the networking of other types of devices and the use of other third party applications.

24 Claims, 6 Drawing Sheets

MULTIPLE CONNECTION NETWORKED MAN-MACHINE INTERFACES FOR COMPUTER NUMERICAL CONTROLS

FIELD OF THE INVENTION

The present invention relates generally to a system for networking multiple man-machine interfaces with multiple computer numerical controls (CNCs), and particularly to a system that facilitates the adaptability of numerous network topologies having M-to-N connections between CNCs and personal computer based man-machine interfaces.

BACKGROUND OF THE INVENTION

A variety of controls are used to monitor and control various types of machine motion. For example, processor based controls, such as computer numerical controls or CNCs, are used to control the motion of machines, such as machine tools or transfer line equipment, that are used in a variety of manufacturing environments. A CNC, for instance, may be used to control the movements of a cutter on a machine tool when machining a part or component for use in the manufacture of a given product.

CNC-type controllers have become very popular due, in part, to their adaptability and relative ease-of-use in controlling machine motion. When machining a part, for example, a machine motion control program, e.g., part program, simply can be loaded into the CNC which then causes the machine to move according to the commands established by the part program. The control is designed to read the part program instructions and provide appropriate outputs to the various servos, stepper motors, etc. that physically move the components of the machine. The CNC also may be used to monitor multiple items related to motion control. For example, in a closed loop type system, a variety of sensors are disposed on the machine to provide outputs to the CNC indicative of various parameters, such as position and speed, so the CNC can compare the sensed parameters with the programmed parameters to detect and correct for any error between the values. As is understood by those of ordinary skill in the art, CNC-type controllers are able to process a wide variety of data related to controlling machine motion, monitoring machine motion, storing and manipulating of part program data, etc.

Traditionally, CNCs have been configured in various ways depending on the CNC design as established by the CNC manufacturer and/or end user. For instance, CNCs typically have included a visual interface, such as a CRT, and a keyboard that allow machine control programs to be entered or edited directly at the CNC. In some systems, machine control programs can be prepared offsite at a workstation, such as a personal computer, that is configured to permit an operator to prepare motion control programs in a language/syntax that is recognizable and useable by the CNC. The program is then loaded onto a storage medium, such as a punch tape, magnetic tape or diskette, and physically taken to the CNC where it is downloaded for use by the CNC in controlling machine motion. For some applications, the program may be transferred electronically from the personal computer to the CNC for execution. In any of these situations, the motion control program must be prepared in a format recognizable and useable by the CNC.

Simultaneously with the development of CNC-type machine controllers, computer networks and personal computers have evolved. Computer networks are now available to permit linking multiple personal computers and other devices across a single network. For example, local area networks (LANs), such as an Ethernet network, can be used to connect multiple personal computers and data servers with each other and with other devices, e.g., printers and various instruments. The common network allows data to be transferred between the various devices linked to the network.

To permit the networked personal computers and other devices to communicate, it is necessary that the devices have compatible application programming interfaces (APIs) to permit data exchange. In the personal computer area, some common API choices are "C" application programming interfaces (CAPI), dynamic data exchange (DDE™) and object linking and embedding (OLE) automation. Each of these choices has its own advantages and disadvantages depending on the PC operating systems, requirements for support on multiple operating systems, and technologies involved.

For example, DDE has become a very popular data exchange mechanism between Windows™-based applications. When using personal computers having Windows-based operating systems, such as Windows NT™ and Windows 95™, DDE may be the data exchange mechanism of choice.

With respect to both stand alone personal computers and networked personal computers, the trend has been toward utilization of Windows-based applications. Consequently, a large percentage of personal computers presently have operating systems that utilize Windows-based applications. In many manufacturing and other machine control environments, it would be advantageous to network one or more CNCs with one or more PC based workstations using Windows. Heretofore, however, machine control and CNC command protocols have not been amenable for use with Windows-based applications. Although the DDE data exchange mechanism, for instance, has been used routinely with Windows to accomplish process-to-process communications, this protocol has not been available for networked CNCs. (It should be noted that DDE, Windows, WindowsNT and Windows95 are trademarks of Microsoft Corporation.)

By, among other things, rendering Windows-based applications compatible with CNCs and CNC protocols, there potentially is a wide variety of network topologies that become possible. For example, in certain manufacturing environments, it would be advantageous to network one personal computer based man-machine interface, utilizing a Windows-based application, with multiple CNCs. This would permit the reading and writing of data and transfer of commands over a common network to the CNCs. In other environments, it would be advantageous to network multiple man-machine interfaces with a single CNC. Ultimately, an open M-to-N topology linking M CNCs with N man-machine interfaces over a commonly used network could provide great convenience and adaptability for supporting many CNC/manufacturing environments as well as supporting other intercommunication between additional applications and devices linked to the common network.

The present invention solves the problem of networking one or more man-machine interfaces, utilizing Windows-based applications, with one or more CNCs over a common network.

SUMMARY OF THE INVENTION

The present invention relates to a system for networking a plurality of man-machine interfaces with a plurality of computer numerical controls. The system comprises a network and a plurality of computer numerical controls linked to the network. Preferably, a machine is linked to each computer numerical control, and each machine includes movable components that undergo predetermined motions provided by the computer numerical control. A plurality of man-machine interfaces also are linked to the network with each man-machine interface preferably comprising a personal computer having a Windows-based operating system. Further, each man-machine interface is configured to communicate with one or more of the computer numerical controls via the network.

According to another aspect of the present invention, a system is provided for networking man-machine interfaces and computer numerical controls. The system includes a plurality of man-machine interfaces, each utilizing a standard process-to-process communication protocol. The system also includes at least one computer numerical control having a processor and a CNC executive capable of controlling machine motion. The man-machine interfaces and computer numerical controls are linked by a network, and the man machine interfaces are configured to selectively communicate with the at least one computer numerical control via the network.

According to yet another aspect of the present invention, a method is provided that implements a computer network for use in a computer numerical control environment. The method comprises linking at least one computer numerical control and at least one personal computer to a network capable of carrying packets of data. In the preferred embodiment, the personal computer utilizes a Windows-based operating system to permit use of Windows based applications. The method further comprises interchanging data related to machine control between the at least one computer numerical control and the at least one personal computer via the network. As necessary, the data transferred over the network is converted into a format recognizable and usable by the computer numerical control and the Windows-based application depending on which of the computer numerical control or Windows-based application is receiving the data.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

The present invention provides a system and method for expanding the convenience, adaptability and use of computer numerical controls (CNCs) in a wide variety of manufacturing and production environments. Specifically, the present invention facilitates the networking of CNCs and personal computer based man-machine interfaces in a wide variety of M-to-N topologies. Depending on the desired or optimal CNC environment, individual CNCs can be networked to multiple man-machine interfaces; a single man-machine interface can be networked to multiple CNCs; or multiple CNCs can be networked with multiple man-machine interfaces that allow commands, instructions and other data to be interchanged between select CNCs and select man-machine interfaces.

Figure 1:
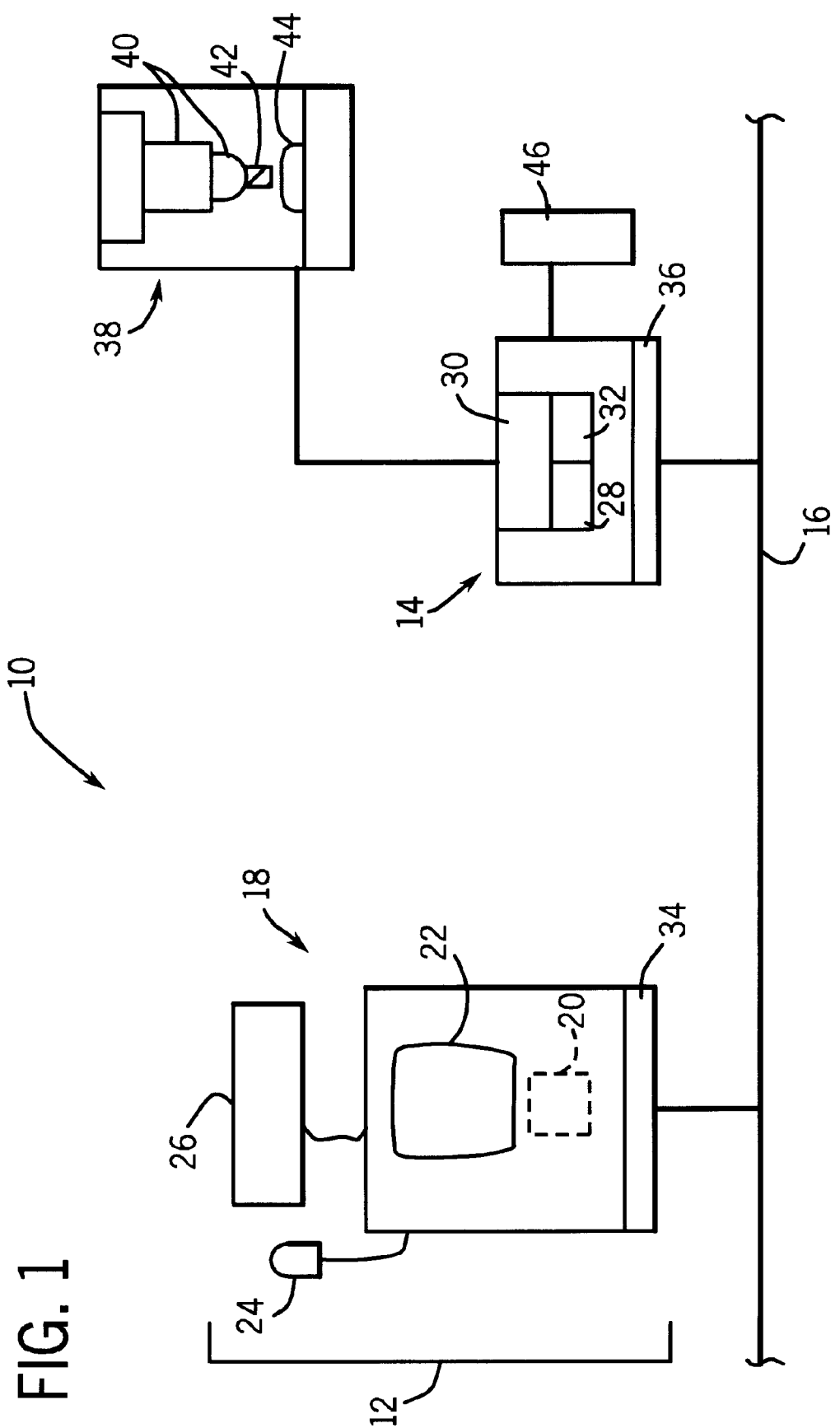
FIG. 1 illustrates a simple topology for a networked CNC system, according to a preferred embodiment of the present invention.

Referring generally to FIG. 1, a system 10 is illustrated according to a preferred embodiment of the present invention. In this illustration, system 10 has a simple topology in which one or more man-machine interfaces 12, e.g., workstations, and one or more CNCs 14 are linked to a network 16 that allows the man-machine interface 12 to communicate with the CNC 14. System 10 utilizes a man-machine interface having a standard process-to-process communication protocol in a commonly used operating system and translates the process-to-process communication protocol to a CNC compatible protocol, or vice versa, to allow communications between the networked CNC and the man-machine interface.

In the preferred embodiment, man-machine interface 12 comprises a personal computer 18 that has a central processing unit (CPU) 20. An exemplary personal computer 18 is configured with a Pentium™ processor rated at 75 MHz or higher. The exemplary PC 18 also has twenty (20) megabytes or more of RAM and at least thirty (30) megabytes of available hard disk space. Furthermore, PC 18 includes a VGA or SVGA monitor 22, a mouse 24 and a keyboard 26 for entering data.

Man-machine interface 12 also comprises a common operating system, such as a Windows-based operating system or a UNIX operating system. Preferably, however, man-machine interface 12 comprises a Windows-based operating system and includes a Windows-based software package, such as WindowsNT. Other Windows packages, such as Windows95, also could be used in system 10. Man-machine interface 12 also implements a standard protocol that allows process-to-process communications. In the preferred embodiment, the protocol utilizes Dynamic Data Exchange (DDE) to allow one DDE-compliant Windows application to communicate with another DDE-compliant Windows application linked to network 16. However, system 10 may be adapted to use other application programming interfaces, such as "C" application programming interface (CAPI) or Object Linking and Embedding (OLE) automation, that also can be adapted to accomplish desired process-to-process communication. Because of their commonly used protocols, CNCs traditionally have not been amenable for communication with such application programming interfaces that utilize, for example, Windows-based applications. Thus, the adaptability and flexibility of Windows-based operating systems have not been sufficiently available in CNC environments. Additionally, this has limited the ability for networking CNCs with other devices or other applications over commonly used networks.

Network 16 may comprise a variety of network types, e.g., WANs or LANs, but in most applications it is a local area network (LAN). For example, network 16 preferably is an Ethernet TCP/IP network that is readily useable for the linking of multiple personal computers, CNCs and other devices and applications.

CNC 14 includes one or more processors 28 that cooperate with a CNC executive 30 to receive data from man-machine interface 12 and to communicate data back to man-machine interface 12. The CNC executive 30, along with processor 28, also executes commands, e.g. part program commands, and monitors the motion and other parameters of a machine under its control. Additionally, CNC 14 includes an available memory 32 into which part programs and other data may be loaded.

An exemplary CNC 14 is a 9/Series CNC using a 9/260 or 9/290 processor available from Allen-Bradley Company, Inc., located at 1201 South $2^{nd}$ Street, Milwaukee, Wis. However, CNC 14 potentially can be selected from a variety of types or brands of computer numerical controls adapted for linking to network 16. With other types or brands of CNC, the protocol conversion must be adapted to accommodate the specific protocol used for that CNC.

Depending on the specific type of network 16 used with system 10, an appropriate communication module 34 is used to link personal computer 18 to network 16. Similarly, an appropriate CNC communication module 36 is connected to CNC 14 to permit CNC 14 to be linked to network 16. Communication module 34 and CNC communication module 36 allow for the sending and receiving of desired packets of data over network 16. An exemplary preferred embodiment of system 10 is described in detail below.

In a typical environment requiring motion control, CNC 14 is connected to a machine 38, such as a machine tool. Machine tools are used to perform a variety of operations, including milling, drilling, boring and grinding. However, CNC 14 can be used to control a variety of other types of machines and processes, including coordinate measuring and part manipulation. In any of these environments, machine 38 typically includes one or mere movable components 40. The motion of movable components 40 is controlled by CNC 14 to manipulate a tool, component or workpiece according to programmed instructions. In a typical machine tool environment, movable components 40 are controlled to move a tool 42 with respect to a workpiece 44. In any of these situations, however, CNC 14 can be adapted to provide the necessary control of machine motion to carry out the desired process, as is understood by those of ordinary skill in the art. The inventive system 10 provides an operator with the convenience, flexibility, adaptability and wide variety of uses for a Windows-based operating system in reading and writing data as well as providing commands between multiple man-machine interfaces 12 and multiple CNCs 14.

Actually, one or more of the CNCs 14 may be individually connected to a standard front panel 46. A standard front panel is a conventional, dedicated interface used by an operator to enter edits, commands and other data directly into a given CNC without transferring data over network 16. Standard front panel typically would comprise a conventional CRT screen and keyboard dedicated to a stand-alone CNC. However, making available one or more networked man-machine interfaces 12 and a standard front panel 46 for a given CNC 14 potentially provides the operator with even greater flexibility for reading and writing data to CNC 14. Each CNC 14, having a standard front panel 46, preferably is configured to permit the operator to choose whether to input data from one of the man-machine interfaces 12 through network 16 or to input data from the standard front panel 46 at the time CNC 14 is initially powered.

Figure 2:
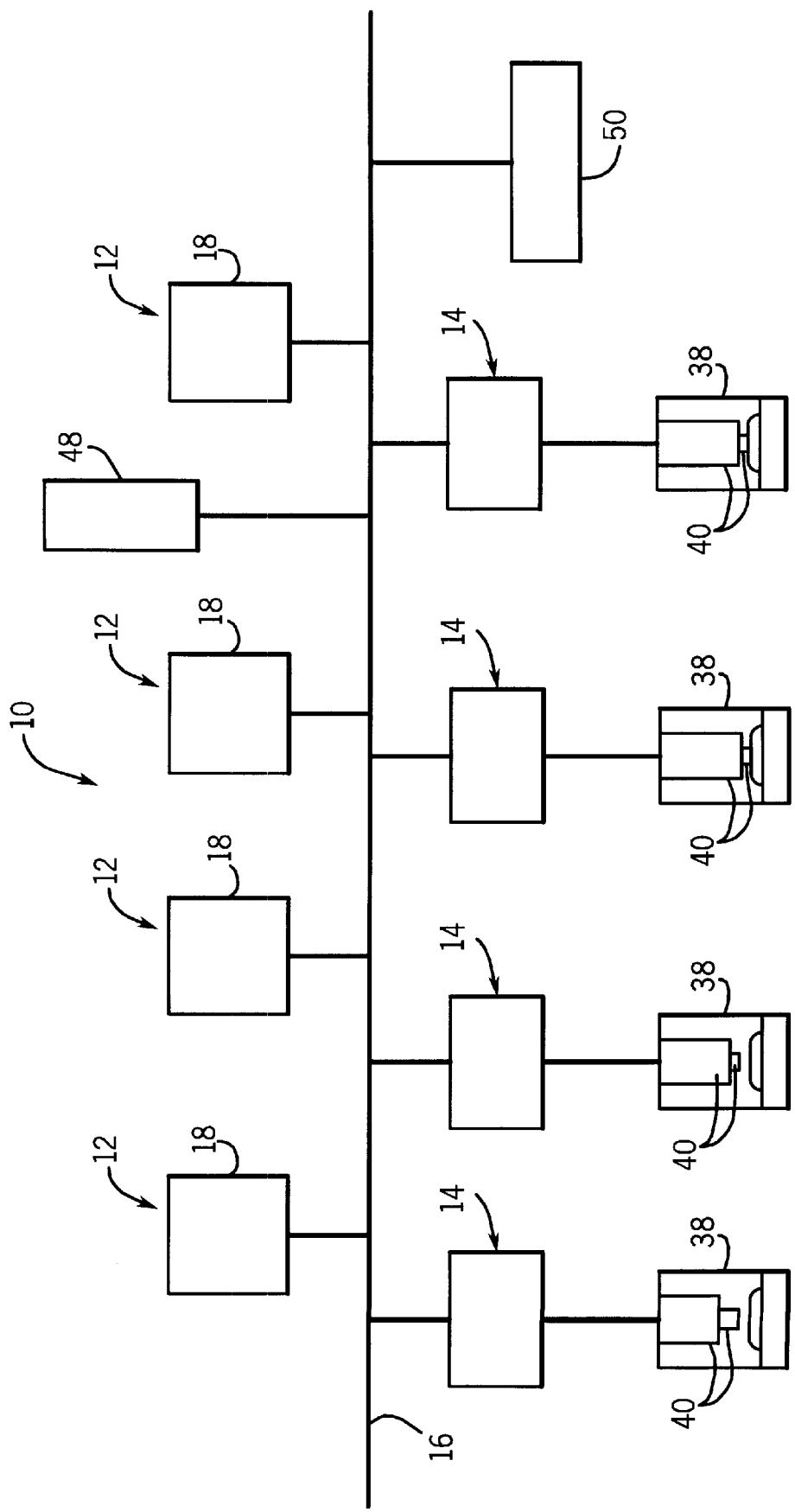
FIG. 2 illustrates an expanded, open M-to-N topology for a networked CNC system, according to a preferred embodiment of the present invention.

Referring now to FIG. 2, a more general topology for system 10 is illustrated. In this embodiment, M man-machine interfaces 12 are networked with N CNCs 14 over common network 16. There are many other potential topologies other than that illustrated in FIG. 2. For example, an individual man-machine interface 12 may be networked with a plurality of CNCs 14. Alternately, an individual CNC 14 may be networked with a plurality of man-machine interfaces 12. The particular topology depends on the needs of the end user and the specifics of the manufacturing or production environment in which system 10 is implemented. Typically, however, each CNC 14 is dedicated to a specific machine or group of machines 38.

The use of a common, open network 16 allows for the linking of additional devices 48, 50 to network 16. Exemplary devices 48 and 50 include other PCs, printers, sensor devices, instruments, etc. that potentially can communicate with one or more of the man-machine interfaces 12. In this type of open network system, the packets of data sent over network 16 must be appropriately addressed to the desired man-machine interface 12, CNC 14 or other device 48, 50.

For example, in the preferred embodiment, each man-machine interface 12 comprises personal computer 18 having a Windows-based operating system that utilizes DDE communications protocol to accomplish process-to-process communications. Additionally, each man-machine interface 12 includes a data server, described more fully below, that converts data from a DDE format to a CNC compatible format and vice versa. With DDE, three pieces of information are supplied to the data server to ensure proper communication to the desired CNC 14 or other device. The three pieces of information are the Service or Application name, the Topic name and the Item name. In this embodiment, the Service or Application name is the data server at the man-machine interface being utilized; the Topic name, for example, is the Ethernet alias for the desired CNC 14; and the Item name is a specific data item or command item. Data items typically are used to read and write data to/from the desired CNC 14 while command items typically are used to request the desired CNC 14 to perform a specific task. This allows an operator to specify the desired request or other data in an application being used at a given man-machine interface 12. The data is then directed to the data server and forwarded to the desired CNC 14. The data is appropriately tagged to allow the CNC to return the requested information to the appropriate man-machine interface 12.

In the preferred embodiment, each CNC 14 has only one controlling man-machine interface 12 at any given time. The first man-machine interface to request control of a given CNC 14 is granted control, and other man-machine interfaces 12 can not control the given CNC 14 until the controlling PC 18/man-machine interface 12 relinquishes control. Specifically, the controlling man-machine interface is determined by a token grant mechanism on a first-come-first-served basis.

As is understood by those of ordinary skill in the art, a token is a small message indicating a free or busy condition. Each CNC 14 retains a token that is provided to the first requesting man-machine interface 12, and subsequently requesting man-machine interfaces are rejected based on the busy condition. Only after the first requesting man-machine interface 12 relinquishes control is the token free for the next requesting man-machine interface. Once in control, the controlling man-machine interface 12 can freely send write requests or DDE commands, for example, to the controlled CNC 14.

The general M-to-N topology described provides great versatility in the transfer of data, including command instructions, to any of a variety of CNCs from one or more workstation locations. However, the preferred system has numerous other advantages due to the linking of the man-machine interfaces 12 and CNCs 14 to a common network, such as an Ethernet network. Such networks readily are used to carry a wide variety of other types of communications to and from other devices. Additionally, the preferred system 10 avoids the requirement that the man-machine interfaces implement specialized communication protocols for use in a CNC environment. Rather, the man-machine interfaces 12 preferably comprise workstations utilizing standard process-to-process communication protocols, such as DDE, used in conjunction with a common operating system, such as a Windows-based operating system.

Figure 3:
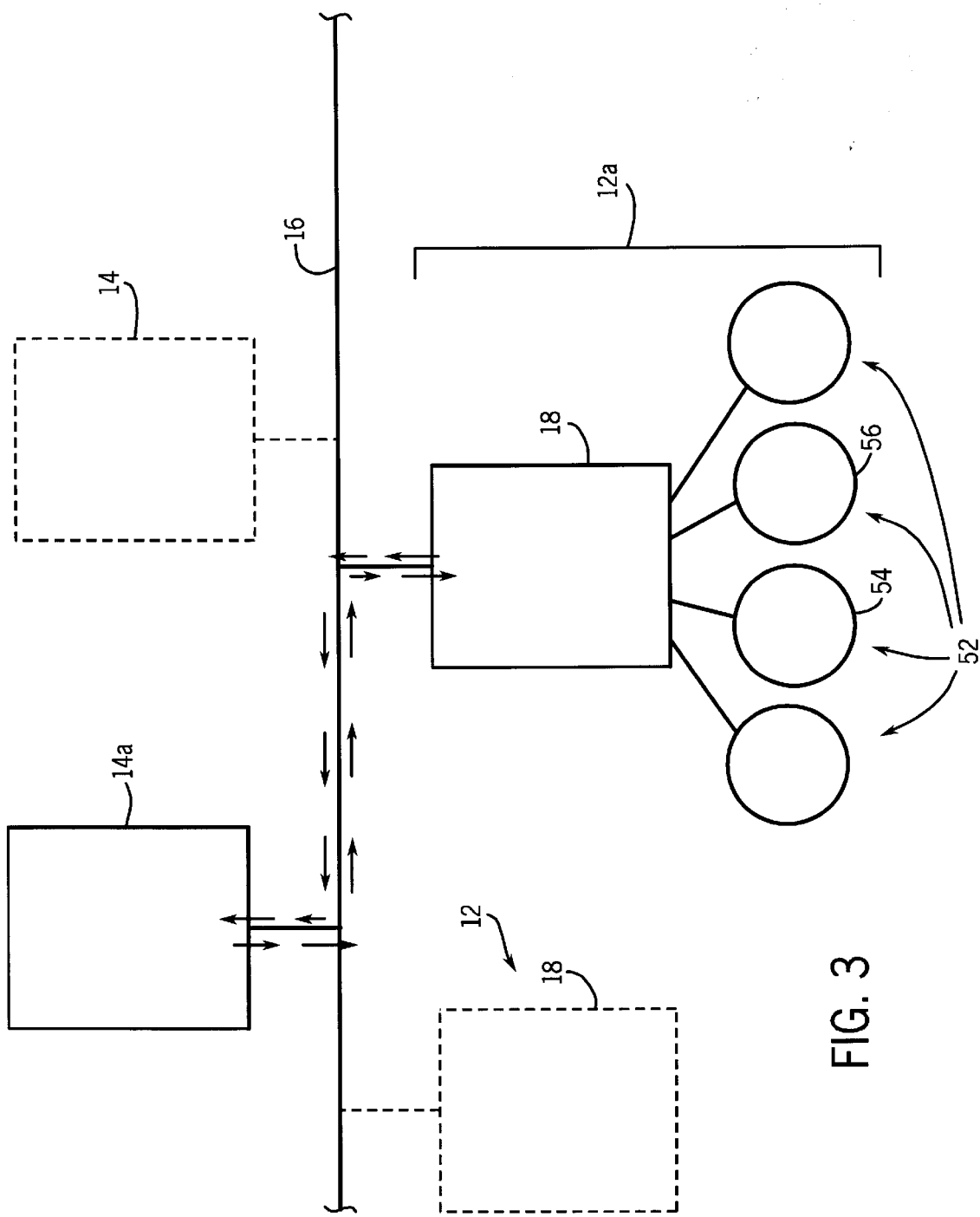
FIG. 3 schematically illustrates the flow of data between one of the networked CNCs and one of the man-machine interfaces illustrated in FIG. 2.

As illustrated in FIG. 3, each CNC 14 potentially can communicate with multiple man-machine is interfaces, e.g., workstations, 12. For example, a given CNC 14a, of the CNCs 14 illustrated in FIG. 2, can be linked over network 16 with a given man-machine interface 12a, of the man-machine interfaces 12 illustrated in FIG. 2, to transfer data therebetween. An operator may enter read and write requests or execute commands remotely at selected man-machine interface 12a for use by a selected CNC 14a. Similarly, CNC 14a can monitor a wide variety of information related, for instance, to the motion of moveable components 40 in machine 38 or the execution of a given part program and transfer specific data back to man-machine interface 12a at appropriate times.

The preferred embodiment of system 10 also allows for the use of additional third party applications 52 on the man-machine interfaces 12. For example, if a Windows-based operating system is used in conjunction with DDE communications protocol on each of the man-machine interfaces 12, a wide variety of Windows-compliant third party applications can be used internally on personal computer 18 and to communicate with other devices 48, 50 linked to network 16 or to access data resident on selected CNCs 14. For example, a Windows-compliant spreadsheet application 54 or a Windows-compliant graphics application 56 can be loaded onto PC 18 and used to directly access CNC data on any selected CNC with no special modification of the system hardware or software. Thus, at each man-machine interface 12, a wide variety of data from multiple CNCs 14 is available for use by the operator in monitoring data, graphing data, storing data or virtually any other function depending on the manufacturing or production environments, the available third party software packages and the goals of the end user.

A specific, preferred embodiment of one type of open control architecture and CNC amenable for use in such a system of open M-to-N topologies is described with reference to FIGS. 4 through 6. The described embodiment, however, should not be construed as limiting the general nature of this invention describing a flexible system for networking CNCs with man-machine interfaces. For example, other types of CNCs and PC based workstations may be adapted for use in such networked CNC environments.

Figure 4:
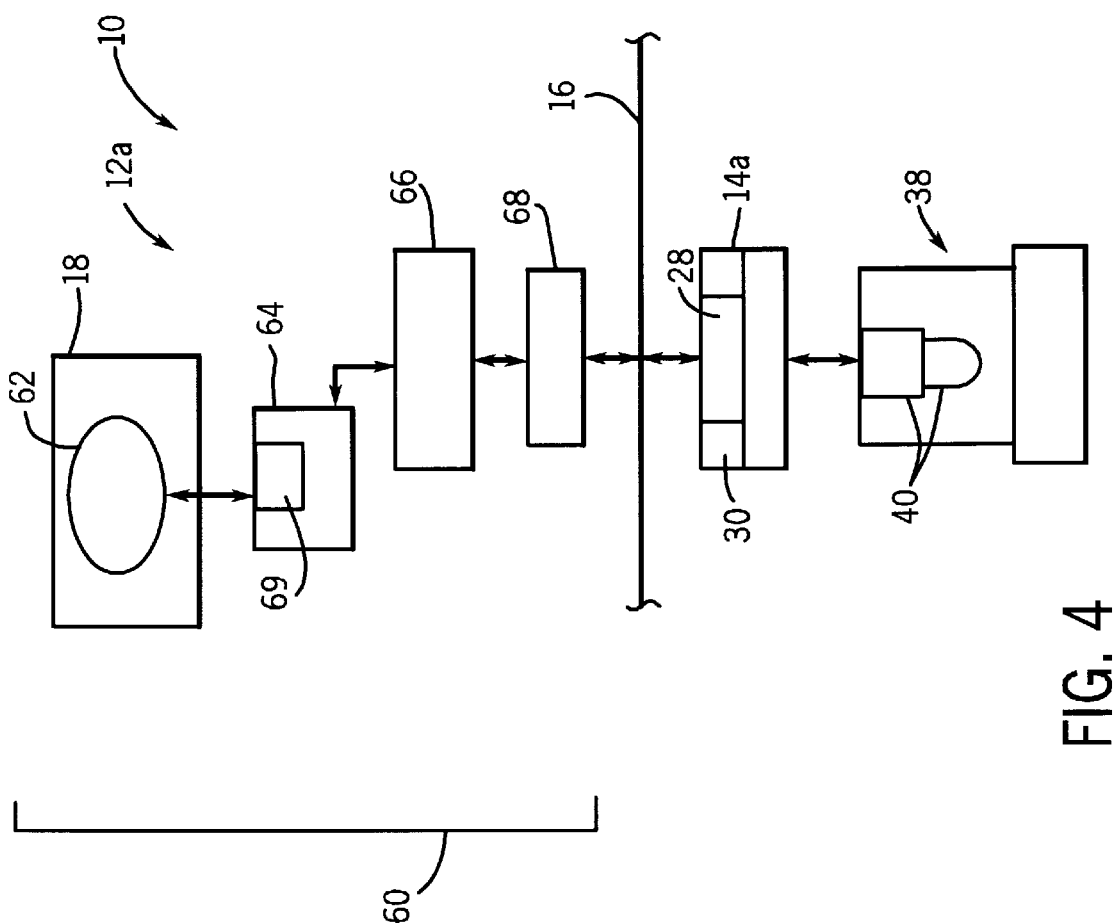
FIG. 4 illustrates a portion of a preferred open control interface adapted to communicate with a CNC over a network such as that illustrated in FIG. 2.
Figure 5:
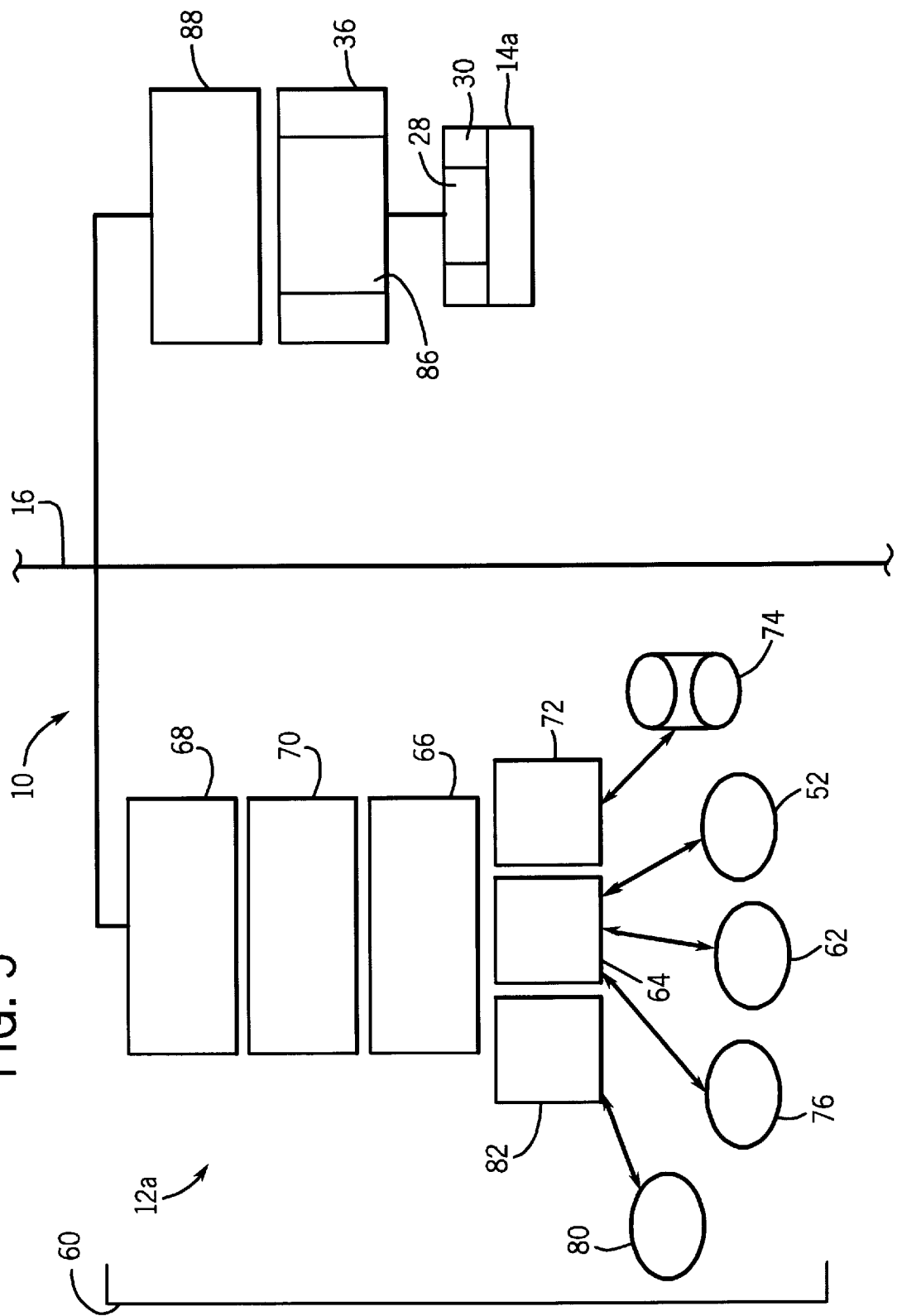
FIG. 5 illustrates one preferred open control interface architecture used with a man-machine interface/CNC system, such as that illustrated in FIG. 2.
Figure 6:
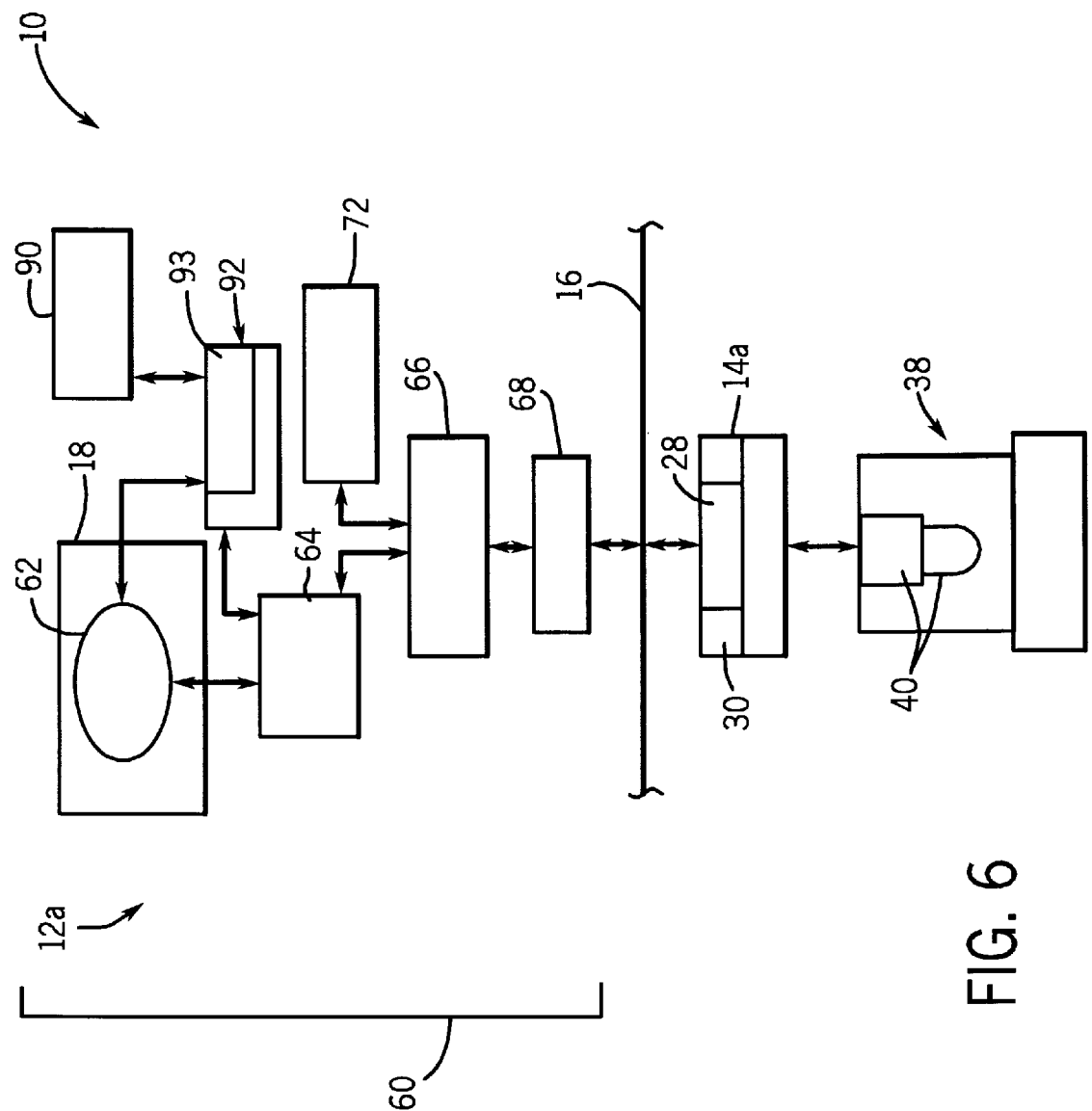
FIG. 6 illustrates additional software modules that can be used with the open control interface illustrated in FIG. 5.

Referring generally to FIGS. 4–6, a preferred embodiment of system 10 is further described with reference to man-machine interface 12a linked over network 16 to CNC 14a. For the purpose of describing the preferred system, man-machine interface 12a and CNC 14a are referenced, but the description applies equally to the other man-machine interfaces 12 and CNCs 14.

In this preferred embodiment, it should be assumed that the Windows-based operating system is WindowsNT version 4.0 or higher, and the process-to-process communication protocol is Dynamic Data Exchange. Thus, each man-machine interface 12 is configured for DDE-compliant Windows applications. However, the present invention should not be construed as limited to this configuration and is adaptable to other versions of Windows, other compatible process-to-process communication protocols and other network types.

The general implementation of a preferred embodiment of CNC 14a linked to man-machine interface 12a is illustrated in FIG. 4. System 10, and specifically man-machine interface 12a, uses an open control interface architecture 60 that utilizes a Windows-based operating system. Open control interface 60 is sometimes referred to as an intelligent front panel as opposed to a standard, dedicated front panel used on a conventional CNC. Open control interface 60 typically includes a personal computer, such as the conventional PC 18 described above. In the preferred embodiment, open control interface 60 combines a WindowsNT operating system with Dynamic Data Exchange so that a variety of DDE-compliant Windows-based applications, e.g., a DDE-compliant Windows application 62, may be used on system 10.

The DDE-compliant application 62 communicates with a conversion module 64 which converts DDE protocol communications/data from the DDE-compliant Windows application 62 to a CNC-compatible protocol. Additionally, conversion module 64 converts data received from CNC 14a into DDE-compliant data that is passed back to DDE-compliant application 62.

Conversion module 64 cooperates with a communication management module 66, preferably a client server, which effectively manages data flow between conversion module 64 and an appropriate network interface 68, e.g. communication module 34 illustrated in FIG. 1, so that the data supplied from conversion module 64 is encoded for transmission across network 16. For example, the client server 66 may encapsulate validated DDE requests provided to conversion module 64; place them into the appropriate parameterized CNC command protocol; and send them to the appropriate CNC 14 over network 16. In this embodiment, network 16 is an Ethernet network and network interface 68 comprises a TCP/IP compatible Ethernet card, such as the Etherlink III™ distributed by 3Com Corporation. Communication management module 66 handles both data from conversion module 64 that is sent to CNC 14a and also data communicated from CNC 14a to conversion module 64.

In the preferred embodiment, conversion module 64 is a data server. An exemplary data server for use with a CNC, such as the Allen-Bradley 9/Series CNC, is the 9/Series OCI Data Server, catalog number 8520-IFP1, that utilizes a software module 69 referred to as RS Server Toolkit™, catalog number 9355WABOEMM, to facilitate translation to the appropriate DDE or CNC protocol used in this exemplary system. The 9/Series OCI Data Server is available from the Allen-Bradley Company, and the RS Server Toolkit is available from Rockwell Software, Inc., a subsidiary of Allen-Bradley Company, Inc. and located at 6680 Beta Drive, Cleveland, Ohio 44143. Additionally, a preferred communication management module 66 also is available from Rockwell Software and is referred to as RSLinx™, catalog number 9355WABOEMM.

The combination of conversion module 64, communication management module 66 and network interface 68 provides for the reading and writing of data as well as the communication of commands, entered via DDE-compliant application 62, with a CNC 14, such as the 9/Series CNC.

The communications (e.g., data organized in packets appropriate for a given network) are transmitted over network 16. Thus, the motion of the movable components 40 of machine 38 may be affected and monitored via the standard PC 18 utilizing a Windows-based operating system. This provides great flexibility in the use of PC 18, not only with the preferred CNC 14a, but with other Windows-compliant devices and other Windows-based applications linked to network 16.

A more detailed schematic of the software architecture of open control interface 60 is illustrated in FIG. 5. As described previously, a DDE-compliant Windows application 62 communicates with a conversion module/data server 64 which, in turn, communicates with communication management module 66. The data server converts communications following DDE protocol into an appropriate protocol that is recognizable and useable by CNC 14a. In the preferred embodiment, communication management module 66 utilizes a communication tool 70, such as the WinSock™ communication tool software available from Microsoft Corporation. These tools provide for the interchange of data, including commands, with CNC 14a via network interface 68 which, in the preferred embodiment, is a TCP/IP Ethernet card having a WinSock-compliant driver (e.g., 3Com Corporation's Ethernet III card).

In addition to the basic software components outlined above, the open control interface 60, preferably includes a file handler 72. File handler 72 cooperates with communication management module 66 and a storage medium, such as a hard disk 74, of personal computer 18. File handler 72 typically is a software module that provides an interface between the hard drive 74 of PC 18 (or another networked drive) and the CNC 14a. This configuration allows an operator to use the hard drive 74 as a location for CNC motion control program storage as well as program execution. The file handler 72, in cooperation with communication tool 70 and network interface 68, provides for the intercommunication of data between CNC 14a and hard drive 74. The exact design or configuration of file handler 72 depends on the particular type of CNC and CNC protocol used in system 10. However, a preferred file handler 72, for use with the exemplary networked 9/Series CNC discussed above, is the 9/Series OCI CNC File Handler, catalog number 8520-IFP1, available from the Allen-Bradley Company. With this type of file handler, CNC 14a can copy and execute part programs that are located in the personal computer directory. Often, however, the part program is loaded on the CNC to minimize the network traffic and to eliminate the time required for transferring part program data over the network during execution of the program. Loading the part program on the CNC is particularly helpful when the program includes very short data blocks used to control certain motions of machine 38.

Additionally, one file handler 72 may be used to provide files, e.g., part programs, to a plurality of CNCs. For example, a request for a certain file may be made at the DDE-compliant Windows application 62. This request is communicated to data server 64 and forwarded to the appropriately addressed CNC, which then requests the desired file from the designated file handler 72. Preferably, only one file handler 72 may be actively connected to the desired CNC at any given time, but the same networked file handler 72 can be used for multiple networked CNCs 14.

The architecture of open control interface 60 facilitates the use of additional CNC applications 76 as well as other third party applications 52, such as those described above, on personal computer 18. The DDE-compliant conversion module/data server 64 allows such Windows-compliant third party applications and CNC applications to be used for the reading and writing of data to CNC 14a or other CNCs or devices linked to network 16, provided the data is appropriately addressed for transfer to and from those other devices, e.g., devices 48 and 50 or other man-machine interfaces and CNCs.

Furthermore, open control interface 60 remains amenable for use with an offline development system 80, such as the Allen-Bradley Offline Development System (ODS), catalog number 8520-ODS, that allow a user to create, edit, document, and troubleshoot machine configuration, machine interfaces, and machine motion control files. The offline development system 80 also can be used with system 10 to upload and download part programs between any of the man-machine interfaces 12 and CNCs 14 in a given topology. When offline development system 80 is connected over a network, such as network 16, it requires an appropriate driver 82, such as the RSI Virtual Device Driver™, catalog number 9355WABOEMM, available from Rockwell Software. Driver 82 cooperates with communication management module/client server 66 to implement communications with CNC 14a.

On the CNC side, CNC 14a communicates with the communications module 36. Communications module 36 includes an appropriate client server 86 adapted to obtain the necessary protocol parts, such as instructions to read data, write data or execute commands, from the data packets that are received over network 16 from DDE-compliant application 62 and data server 64. The client server 86 presents these instructions/requests to CNC 14a where they are appropriately processed by CNC processor 28 and executive 30. Communications module 36 cooperates with a driver 88 such as an Ethernet TCP/IP driver, to send and receive data and commands over Ethernet network 16.

The design of communications module 36 and client server 86 depends on the preferred CNCs and protocols implemented in system 10. However, in the exemplary preferred embodiment, an Ethernet module, such as the 9/Series OCI Ethernet module, catalog number 8520-ETCP, available from the Allen-Bradley Company, may be used as an interface between the CNC and an Ethernet TCP/IP compatible network. This type of Ethernet module provides for commands and data transfers to/from systems running a suitable conversion module/data server 64. The Ethernet module also passes through instructions from conversion module/data server 64 to the CNC regarding the transfer of CNC part programs from file handler 72 (the CNC then sends the appropriate request to file handler 72 for the desired part program); facilitates transmission of commands and file transfers from off-line development system 80; and allows updates to be made to the CNC executive.

As illustrated in FIG. 6, certain other features may be combined with system 10 to enhance performance, adaptability and ease-of-use for the operator. For example, a customized display set 90 may be helpful in allowing a user to prepare an operator interface having desired screens displayed on the monitor 22 of PC 18. The screens can be customized, for instance, to emulate screens with which the operator is familiar. For example, the 9/Series Basic Display Set, available from the Allen-Bradley Company, is a DDE-compliant application that provides the user interface between PC 18 of man-machine interface 12a and CNC 14, e.g., a 9/Series CNC. This software emulates the 9/Series CNC screens and allows the user to control, program, position and monitor the CNC via an interface that is recognized and comfortable for the operator to use.

Additionally, a performance enhancement software module 92 may be used to provide enhanced performance for systems implementing Rockwell Software's AdvanceDDE™ protocol. For example, Rockwell Software supplies a software module referred to as RSData™, catalog number 9361DATAOCXOEM, that can be used with suitable DDE-compliant applications 62 and conversion module/data server 64 to provide enhanced performance in a system that conforms to the AdvanceDDE protocol. RSData takes advantage of a high speed DDE communications module 93, such as Rockwell Software's RSJunctionBox™, catalog number 9361JBOXOEM, that facilitates considerably higher performance between appropriate DDE-compliant applications and data servers. The foregoing provides examples of potential modifications to system 10.

Another advantage of system 10 is its unique ability to preserve both CPU and network bandwidth by limiting the flow of data over network 16 between any of the selected CNCs 14 and the selected man-machine interfaces 12. In other networked systems, network devices are continuously polled for data over the network by a workstation, e.g., a PC. However, with system 10, the polling of data preferably is performed internally to each CNC 14 by its own processor 28, and data is transmitted over network 16 to the selected man-machine interface 12 only when necessary or at predetermined, limited times. This preserves not only network bandwidth but also the personal computer's CPU 20 bandwidth by releasing the CPU from handling the polling tasks and allowing man-machine interface 12/PC 18 to communicate with other networked devices or run other applications. Without the ability to push polling responsibility to the CNC 14, certain machining environments or CNC applications might require a dedicated PC.

In some situations, CPU bandwidth is further preserved by pushing other data handling tasks to the CNC (e.g. loading part programs directly into the CNC); by utilizing the greater efficiency of AdvanceDDE protocol; and by bundling related and/or unrelated pieces of data that are sent over network 16 to a desired CNC 14 as "bundled packets". The use of bundled packets reduces the time otherwise spent by CPU 20 in managing the transfer of numerous smaller pieces of data.

It will be understood that the foregoing description is of a preferred exemplary embodiment of this invention and that the invention is not limited to the specific forms shown. For example, numerous M-to-N topologies may be adapted according to manufacturing needs. The specific man-machine interfaces, CNCs and various software modules that permit Windows-based operating systems to be networked with CNCs is of a preferred, illustrative embodiment only. As is understood by those of ordinary skill in the art, the specific conversion techniques and software module configurations depend on the specific protocols used in a given system, e.g., the specific Windows-based process-to-process protocol as well as the protocol or protocols recognized and used by a given CNC. Also, there are a variety of ways to address and otherwise format the data packets communicated between a given Windows-based application and a given CNC. The specific handling of data depends on the type of network used, the operating system version chosen, the need for linking with multiple types of operating systems, the brand or type of CNC and the other technologies incorporated into the system. However, these and other modifications may be made in the design and arrangement of the elements described above without departing from the scope of the invention as expressed in the appended claims.

What is claimed is:

1. A system for networking a plurality of man-machine interfaces with a plurality of computer numerical controls, comprising:

a network;

a plurality of computer, numerical controls linked to the network each computer numerical control having the capability of being linked to at least one machine, wherein each computer numerical control is able to control the motions of the machine to which it is linked; and a plurality of man-machine interfaces linked to the network, each man-machine interface comprising a personal computer having a Windows-based operating system, wherein each man-machine interface is configured to communicate with one or more of the computer numerical controls via the network.

2. The system as recited in claim 1, further comprising additional networked devices linked to the network, wherein one or more of the man-machine interfaces is able to communicate with the additional networked devices.

3. The system as recited in claim 1, wherein the network comprises a local area network.

4. The system as recited in claim 1, wherein the network comprises an Ethernet network.

5. The system as recited in claim 1, wherein each computer numerical control may be coupled to one or more machine tools.

6. The system as recited in claim 1, wherein each computer numerical control is configured to receive communications from at least three man-machine interfaces.

7. The system as recited in claim 1, wherein each computer numerical control is configured to receive communications from at least four man-machine interfaces.

8. The system as recited in claim 6, wherein only one of the man-machine interfaces serves as a controlling man-machine interface at any given time, further wherein the controlling man-machine interface controls communications sent to a designated computer numerical control until that control is relinquished.

9. The system as recited in claim 1, wherein the man-machine interface comprises an application program interface configured for use with the Windows-based operating system.

10. The system as recited in claim 9, wherein the application program interface comprises Dynamic Data Exchange (DDE).

11. The system as recited in claim 10, wherein each man-machine interface comprises a data server configured to convert communications in DDE format to a format recognizable and usable by one or more of the plurality of computer numerical controls.

12. The system as recited in claim 1, further comprising a plurality of non-networked front panels, each non-networked front panel being dedicated to one computer numerical control of the plurality of computer numerical controls.

13. A system for networking man-machine interfaces and computer numerical controls, comprising:

a plurality of man-machine interfaces, each utilizing a process-to-process communication protocol;

at least one computer numerical control including a processor and a CNC executive capable of controlling machine motion; and an open network to which multiple types of devices may be linked, the plurality of man-machine interfaces and the at least one computer numerical control being linked to the network, wherein the plurality of man machine interfaces are configured to selectively communicate with the at least one computer numerical control via the network.

14. The system as recited in claim 13, wherein each man-machine interface comprises a Windows-based operating system for utilizing a Windows-based application.

15. The system as recited in claim 14, wherein the man-machine interface is configured to convert communications from each Windows-based application into a protocol recognizable and usable by the at least one computer numerical control.

16. The system as recited in claim 15, wherein the man-machine interface is configured to convert communications from the at least one computer numerical control into a protocol recognizable and usable by each Windows-based application.

17. The system as recited in claim 16, wherein the at least one computer numerical control comprises a plurality of computer numerical controls.

18. The system as recited in claim 17, wherein the plurality of computer numerical controls are configured to be coupled to a plurality of machines, each machine having movable components for conducting an operation on a workpiece, wherein the motion of the movable components of each machine may be controlled by one of the plurality of computer numerical controls.

19. A method for implementing a computer network for use in a computer numerical control environment, comprising:

linking at least one computer numerical control to a network capable of carrying packets of data;

linking at least one personal computer, utilizing a Windows-based application, to the network;

exchanging data related to machine control between the at least one computer numerical control and the at least one personal computer via the network; and converting the data into a format recognizable and usable by the computer numerical control and the Windows-based application depending on which of the computer numerical control or the Windows-based application is receiving the data.

20. The method as recited in claim 19, wherein the step of linking at least one numerical control includes linking a plurality of computer numerical controls to the network.

21. The method as recited in claim 20, wherein the step of linking at least one personal computer includes linking a plurality of personal computers to the network.

22. The method as recited in claim 19, wherein the step of converting includes converting data from a DDE format to a computer numerical control compatible format and converting data from the computer numerical control compatible format to the DDE format.

23. The method as recited in claim 22, further comprising linking additional devices to the network and exchanging data between the at least one personal computer and the additional devices.

24. The method as recited in claim 19, further comprising utilizing third party applications on the personal computer.

* * * * *